United States Patent [19]

Madison et al.

[11] 4,156,863

[45] May 29, 1979

[54] CONICAL BEAM TRANSDUCER ARRAY

[75] Inventors: Theodore C. Madison, Santa Barbara, Calif.; Rufus L. Cook, Panama City, Fla.

[73] Assignee: The United States of America as represented by the Secretary of the Navy, Washington, D.C.

[21] Appl. No.: 901,037

[22] Filed: Apr. 28, 1978

[51] Int. Cl.[2] .............. H04B 13/00

[52] U.S. Cl. .............. 340/9; 340/10

[58] Field of Search .............. 340/8-14; 310/325

[56] References Cited

U.S. PATENT DOCUMENTS

| | | | |
|---|---|---|---|
| Re. 25,433 | 8/1963 | Rich | 310/325 |
| 2,806,216 | 9/1957 | Fryklund | 340/9 |
| 3,187,207 | 6/1965 | Tomes | 310/325 |
| 3,409,869 | 11/1968 | McCool et al. | 340/9 |
| 3,601,789 | 8/1971 | Sullivan | 340/9 |
| 3,739,327 | 6/1973 | Massa | 340/10 |

*Primary Examiner*—Harold J. Tudor

*Attorney, Agent, or Firm*—Richard S. Sciascia; Harvey A. David

[57] ABSTRACT

A wide angle, wide bandwidth sonar transducer comprising a spherically curved array of transducer elements fully embedded in a body of acoustically transparent potting compound with their axes extending radially outwardly of a spherically curved wall to which they are bonded. Each includes an aluminum load element bonded to a piezoelectric element and is characterized by an electrical terminal press fitted into the load element. A method of manufacture for achieving the desired array formation within the potting compound utilizes a pattern from which a form is cast to hold the transducer elements in formation while being bonded to the curved wall, after which the form is removed and additional potting is cast.

3 Claims, 7 Drawing Figures

CONICAL BEAM TRANSDUCER ARRAY

BACKGROUND OF THE INVENTION

This invention relates to sonar transducers and more particularly to an improved, wide bandwidth sonar transducer array characterized by a multiplicity of electro-acoustic transducer elements in a spherically curved arrangement so as to provide a wide angle, conical beam, and further to a method of manufacture of the array.

Sonar transducers comprising arrays of a multiplicity of transducer elements arranged in various configurations including plane, cylindrical, and spherical are known in the art. One object has generally been to form narrow beams by various phase shifting or delay processing of the inputs/outputs of individual elements. In the case of curved arrays, focusing of acoustic energy to provide an intensely insonified region has been in some instances an object and in other instances a problem. Moreover, in high power arrays comprising a multiplicity of individual transducer elements, maintaining the integrity of electrical and mechanical connections has been a problem of long standing.

Sonar arrays are generally more or less individually constructed by hand, and the placing of elements is generally critical to performance. Particularly in the case of spherically curved arrays, proper element placing and uniformity of performance from array to array is difficult to achieve. Accordingly, as in any field of production, manufacturing methods that lead to precision in translating design to practical embodiment is desirable.

SUMMARY OF THE INVENTION

With the foregoing in mind, it is a principal object of this invention to provide an improved wide angle, sonar array.

Another object of the invention is to provide a spherically curved sonar array comprising a multiplicity of transducer elements that vibrate radially of the array to provide a substantially uniform directivity pattern throughout a characteristic wide angle, conical beam.

As another object the invention aims to provide a spherically curved sonar array of the foregoing character that is efficient in operation, capable of high-power use, and is notably reliable in its mechanical and electrical aspects.

Yet another object of this invention is the provision of an improved method of manufacturing of a curved sonar array including a plurality of transducer elements that must be located with precision in order to assure a substantially uniform response pattern over a wide angle.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
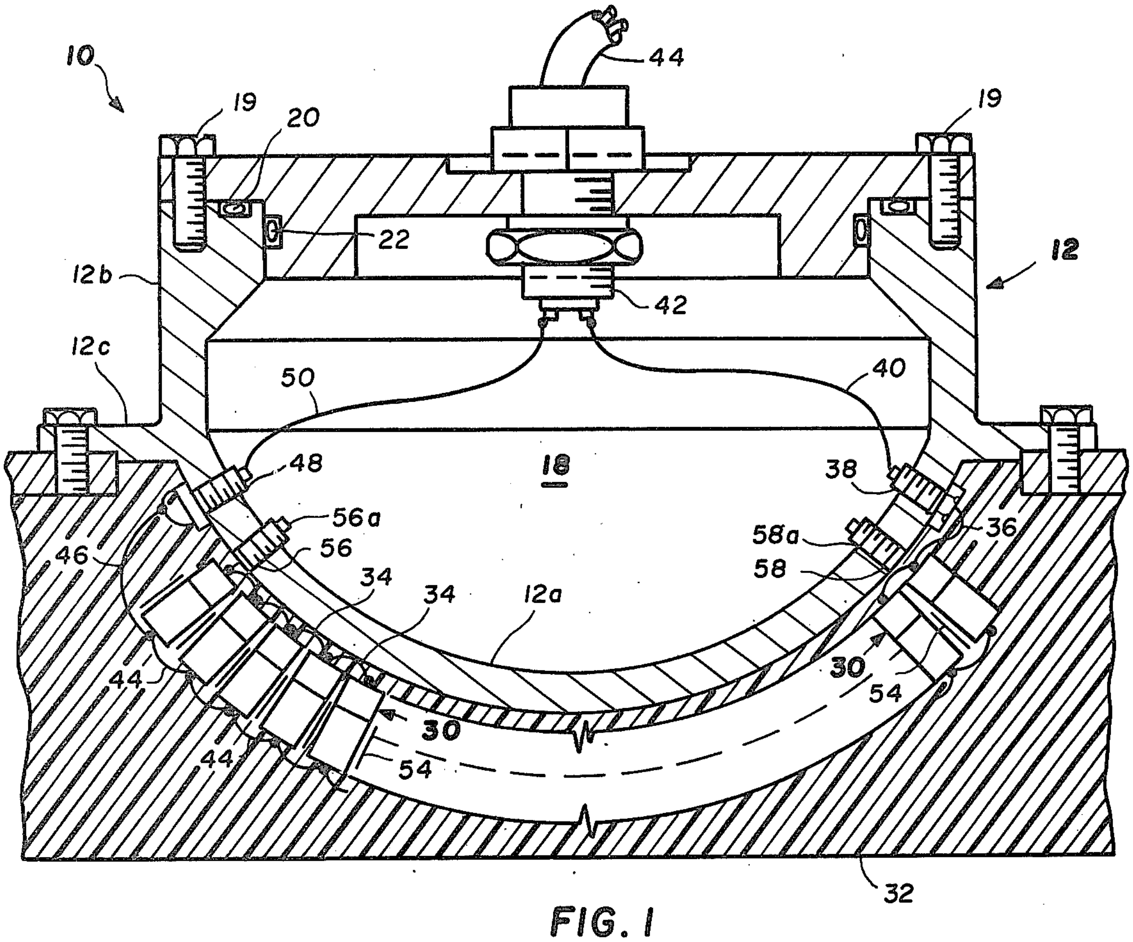
FIG. 1 is a vertical sectional view of a wide angle sonar transducer array embodying the invention, with portions broken out for clarity.

In the form of the invention illustrated in FIG. 1, a sonar transducer array 10 is provided having a wide angle, conical beam, the response characteristics of which are substantially uniform across the entire directivity pattern of the array. The array 10, which in this example looks downwardly from a supporting ship hull or the like, not shown, comprises a hollow aluminum frame or housing that is indicated generally at 12 and includes a spherically curved wall 12*a*, a generally cylindrical wall 12*b*, and an outwardly extending annular flange 12*c*. A cover plate 14 is secured by screws 16 to the wall 12*b* and cooperates with the housing 12 to define a cavity or air chamber 18. The plate 14 is conveniently sealed relative to the housing 12 by O-rings 20,22 seated in annular grooves in the housing and plate, respectively.

Figure 2A:
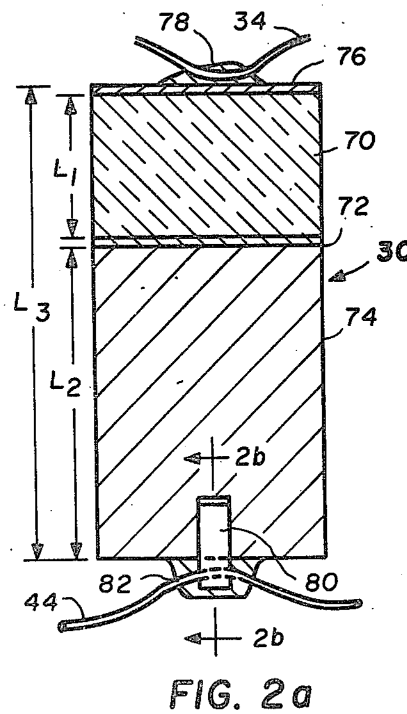
FIGS. 2*a* and 2*b* are sectional views, on an enlarged scale, illustrating the structure of an individual transducer element of the array of FIG. 1.
Figure 2B:
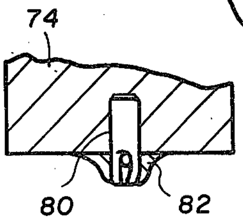

Disposed in spaced relation to the outer surface of the spherically curved wall 12*a*, which acts as an acoustic baffle plate, are a multiplicity of cylindrical transducer elements 30. The elements 30, later described in more detail with reference to FIGS. 2*a* and 2*b*, extend radially outwardly relative to the curved wall 12*a*. In FIG. 2, only a portion of these elements 30 are illustrated, it being understood that numerous other such radially oriented elements are arranged with their faces lying in a mutual spherically curved pattern subtending the apex angle of the desired conical beam. The elements 30 are fixed in position by a waterproof and electrically insulating bonding and potting material 32, which has an acoustic index of refraction approximating that of water in which the array is to be used. It will be noted that the potting material 32 completely surrounds each of the elements 30 and has a thickness between the inner end of each element and the outer surface of the wall 12*a* of about quarter wave length of the center frequency with which the array is to be operated. One suitable potting material used in a working embodiment of the invention is that sold under the name "RHO-C-35075" by B. F. Goodrich.

The inner ends of the transducer elements 30 are electrically interconnected by conductors 34 and are connected by conductor 36, through an insulating feed through connector 38, wire 40, and a terminal member 42 to a suitable electrical cable 44. Similarly, the outer ends of the transducer elements 30 are electrically interconnected by conductors 44 and are connected by conductor 46, through an insulating feed through connector 48, wire 50, and the terminal member 42 to the electrical cable 44.

Each of the transducer elements 30 is separated from the adjacent elements 30 by the potting material 32 and also by strips 54 of compressed onionskin paper. The latter serve as decoupling means between adjacent elements 30 and provide for a more uniform directivity pattern than can be achieved in their absence. It is worthy of note at this point that the wall 12*a* is advantageously of a thickness that is substantially some multiple of one quarter wave length of the operating frequency. The wall 12*a* is provided with threaded openings 56,58, normally blocked by plugs 56*a*, 58*a*, which openings are used during manufacture in accordance with the method later to be described.

Referring now to FIGs. 2*a* and 2*b*, each transducer element 30 comprises a cylindrical piezoelectric element 70 having a length $L_1$ that is one-quarter wavelength of the principal operating frequency. The piezoelectric element 70 has bonded thereto, with epoxy cement 72, a cylindrical loading element 74 having a length $L_2$ that is also one-quarter wavelength of the operating frequency. In this embodiment the piezoelectric element 70 is formed of a ceramic material such as that sold under the name "CHANNELITE 5400" while the loading element 74 is formed of aluminum, the difference in velocity of sound in those two materials accounting for the difference in lengths $L_1$ and $L_2$. An example of a suitable bonding cement 72 is that sold under the name "ARMSTRONG 934." .

The free end of the piezoelectric element 70 of the transducer element 30 is provided with an electrode 76, conveniently in the form of one of the well known conductive coating materials, to which the solder or epoxy connection 78 of the conductors 34 can readily be made. It will be understood that the thicknesses of the electrode 76 and the epoxy bonding cement 72 are exaggerated in the drawings, for clarity.

A brass dowel 80 is pressed into a bore in the free end of the loading element 74, with a portion of the dowel remaining exposed to serve as a terminal for electrical connection to wires 42. As is best shown in FIG. 2*b*, the exposed portion of the dowel 80 is slotted to accept the wire 44, and then bent or crimped over the wire to effect positive mechanical and electrical union with the wire.

The connection may then be soldered, or bonded with a conductive epoxy as at 82. It has been found that the just described connection has no material effect on the loading of the transducer element 30, and avoids problems of mechanical or electrical failure of the connection that have occurred when electrical conductors have been soldered or epoxied directly to the aluminum element 74.

The total length of the element 30, exclusive of the electrical connection just described, is shown as $L_3$.

Figure 3:
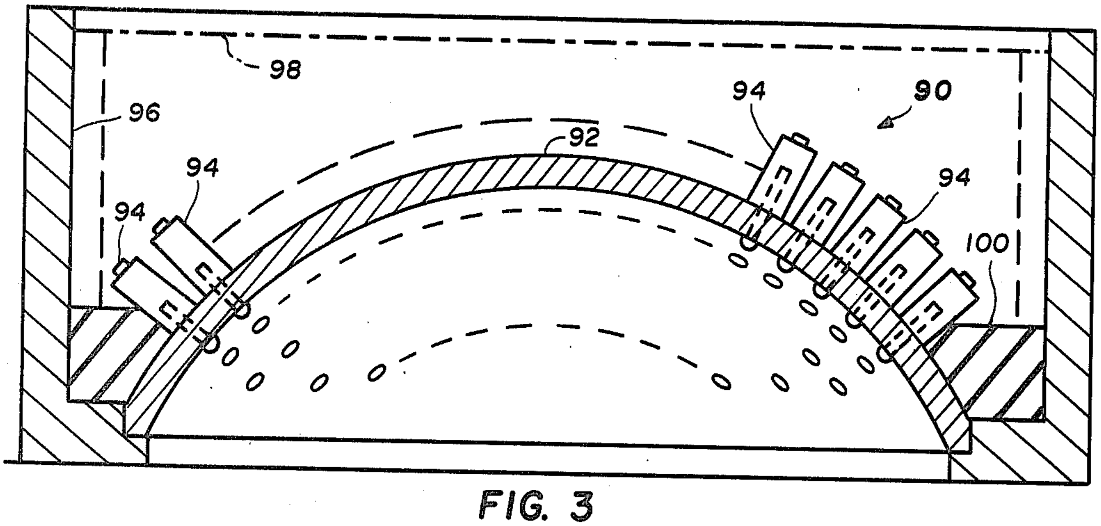
FIGS. 3–5 are vertical sectional views illustrating steps in the method of manufacture of the array of FIG. 1.

Now will be described the method of manufacture of the array 10. Referring to FIG. 3, a molding pattern, generally indicated at 90, is prepared comprising a spherically curved plate 92 having a convex surface of somewhat larger radius than the convex surface of wall 12. Removably fixed to the plate 92, and comprising part of the pattern 90, are a plurality of cylindrical plugs 94, conveniently formed of a rigid plastic such as hard nylon. The plugs 94 are of substantially the same diameter as the transducer elements 30, but are somewhat shorter than the length $L_3$ thereof, for a purpose which will become apparent as this specification proceeds. The plugs 94 are positioned on the plate 92 in accordance with the desired arrangement of transducer elements 30 in the finished array 10. A confining wall 96 is provided around the pattern 90 and is filled to a level 98 with a rubber molding material to cast a form 100 a portion of which is shown in FIG. 3.

Figure 4:
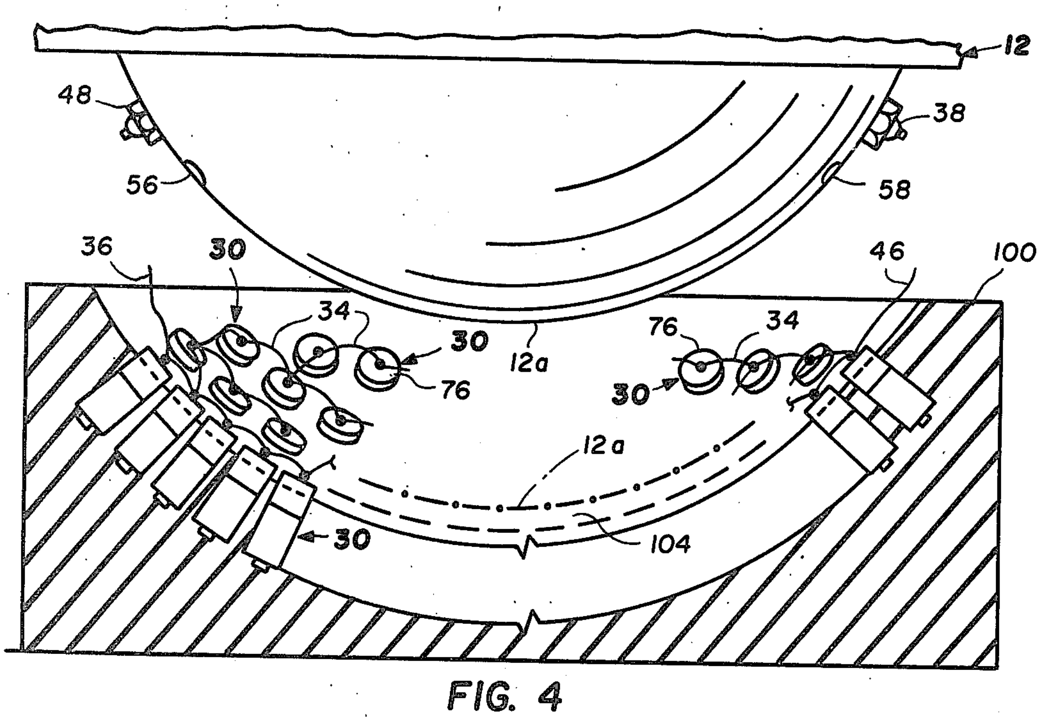

After curing, the pattern 90 is removed from the form 100. The form 100 is then inverted as shown in FIG. 4, and the as yet unwired transducer elements 30 are inserted into the recesses vacated by the removed plugs 94. Because the length $L_3$ of each element 30 is greater than the lengths of the plugs 92, the ends of the elements 30 are exposed above the spherically curved concave surface 102 of the form 100. With the transducer elements 30 so positioned in the form 100, the wire conductors 34 are connected to the electrodes 76 thereof.

The housing 12 is then positioned over the form 100 and lowered to bring the convex surface of wall 12*a* to the dot and dash line position thereof shown in FIG. 4. This establishes a predetermined space 104 between the wall 12*a* and the form 100, into which space the exposed, wired ends of the transducer elements 30 project. With the housing 12 so positioned, wire lead 46 is connected to the feed-through connector 38, and lead 36 is connected to the feed-through connector 48.

Plugs 56*a* and 48*a* are then removed and uncured potting compound 32 introduced through at least one of the openings 56, 58 so as to fill the space 104. This step may be facilitated by drawing a vacuum at the other of the openings. The potting compound 32 may be any of a number of commercially available materials that will cure in place, serve as an effective bonding agent, be transparent to acoustic signals, and provide a substantial acoustic impedance match with water while being substantially impervious thereto. One that has been used successfully is the polyurethane material sold under the name "RHO-C-35075" by B. F. Goodrich.

Figure 6:
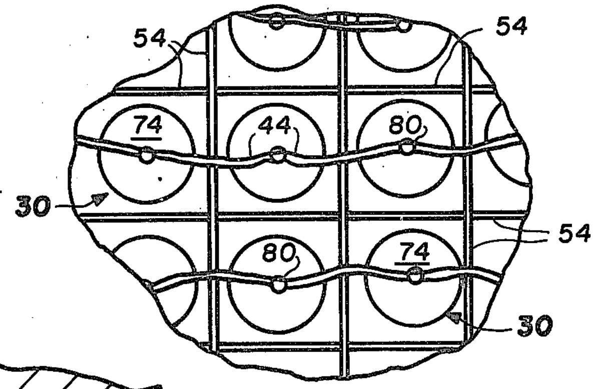
FIG. 6 is an enlarged view, taken substantially along line 6—6 of FIG. 5, illustrating the incorporation of decoupling means in the array.
Figure 5:
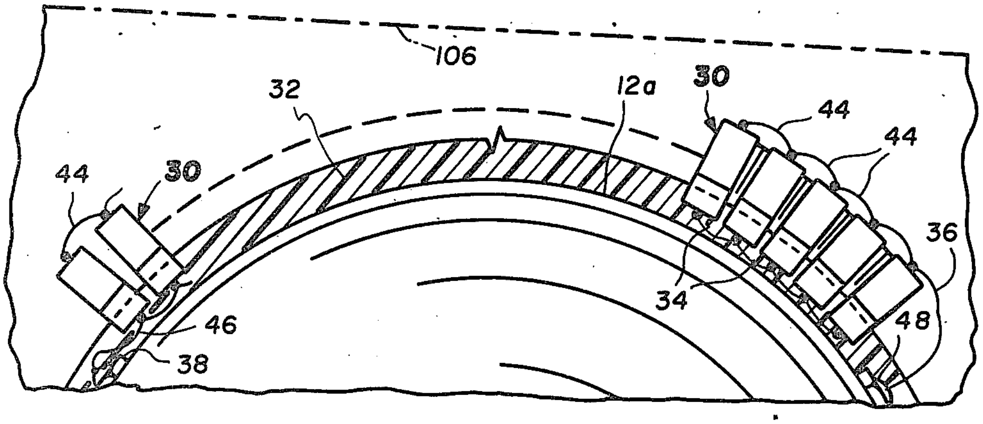

When the potting compound filling space 104 has cured so as to bond the inner ends of the transducer elements 30 to the wall 12*a* and encapsulate the wire 34, the rubber form 100 is stipped or removed from the transducer elements 30, the form being conveniently sacrificed by cutting for ease of removal. Thereafter, the housing 12 with the bonded transducer elements 30 is inverted as shown in FIG. 5, and the earlier mentioned decoupling strips 54 placed between the transducer elements. These are conveniently formed of a material such as pre-compressed onion-skin paper, and are arranged in crossing relation, egg-carton fashion, as is best seen in FIG. 6. The wire connections 44 are then made between the ends of the transducer elements, as described earlier, and lead 36 connected thereto.

The remainder of the potting material 32 is then applied over the assembly in FIG. 5 so as to complete the embedment of the transducer elements 30, wires 44,36, and the decoupling strips 54, the potting material being brought to the level of the dot-and-dash line 106. Because the later applied potting material 32 bonds to the earlier applied material 32, the transducer elements become completely surrounded in a substantially homogenous body thereof as shown in FIG. 1. Of course, a protective layer or skin of wear resistant material may be added to the surface of the material 32 that will be exposed to water, if desired.

Oviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A wide angle sonar transducer for operation under water to form a conical sonar beam in a range of frequencies including a principal operating frequency, said transducer comprising:

a hollow, rigid frame formed of metal and comprising a spherically curved wall presenting spherically curved convex and concave outer and inner surfaces, respectively, said spherically curved wall being characterized by a thickness about equal to one quarter wave length of said principal operating frequency;

said frame defining an air chamber on the side of said wall presenting said concave surface;

a closure plate secured to said frame in spaced relation to said curved wall and defining in part said air chamber;

a multiplicity of elongated cylindrical transducer elements having their central axes extending radially outwardly of said spherically curved wall, said transducer elements having outer and inner end surfaces with each of said inner end surfaces from said convex surface by a predetermined distance and having their outer end surfaces lying in a mutual spherically curved pattern substending the apex angle of said conical sonar beam;

a body of waterproof and electrically insulating potting material completely surrounding each of said transducer elements, said material having an acoustic index of refraction approximating that of water;

said material having thickness between the inner end surface of each transducer element and said outer surface of said wall of about a quarter wave length of said principal operating frequency; and each said transducer element comprising a cylindrical piezoelectric element comprising the inner end portion of said transducer element and presenting said inner end surface, a cylindrical aluminum load element conductively bonded to said piezoelectric element and comprising the outer end portion of said transducer element, an electrode comprising a conductive coating on said inner end surface, an electrical terminal comprising a brass pin fixed with a press fit in a central bore of said load element so as to be exposed at the center of said outer end surface, and a conductor connected to said brass pin.

2. A wide angle sonar transducer as defined in claim 1, and further comprising:

acoustic decoupling means disposed between said transducer elements and embedded in said potting compound.

3. A wide angle sonar transducer as defined in claim 2, and wherein said acoustic decoupling means comprises:

intersecting strips of compressed onionskin paper, disposed between said transducer elements so as to separate each transducer element from the others, whereby a substantially uniform directivity pattern is achieved.

* * * * *